UNITED STATES PATENT OFFICE.

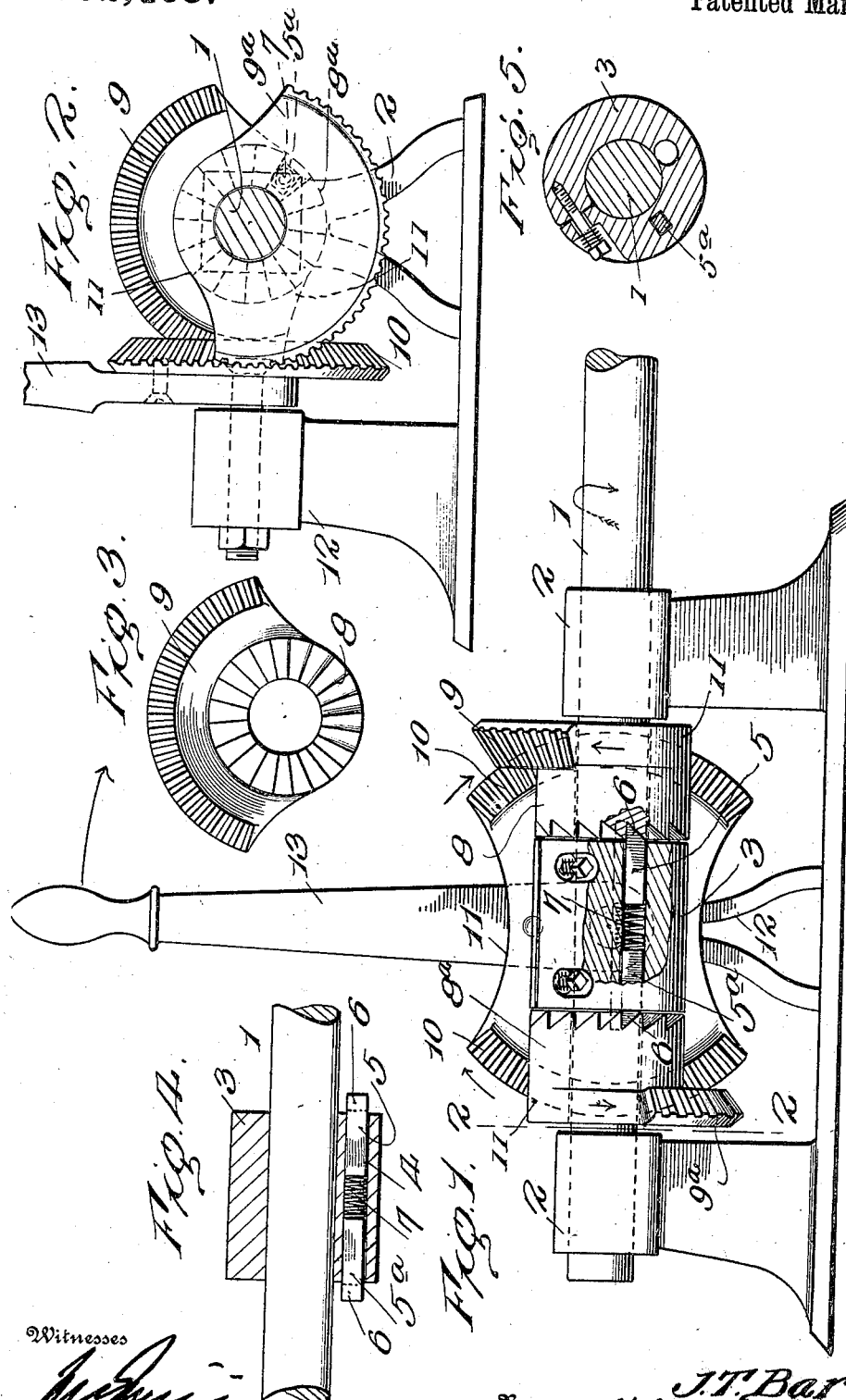

JAMES T. BARBER, OF BROOKLYN, NEW YORK.

STARTING DEVICE FOR ENGINES.

952,405.  Specification of Letters Patent.  Patented Mar. 15, 1910.

Application filed December 22, 1908. Serial No. 468,882.

*To all whom it may concern:*

Be it known that I, JAMES T. BARBER, citizen of the United States, residing at Brooklyn, in the county of Kings and State of New York, have invented certain new and useful Improvements in Starting Devices for Engines, of which the following is a specification.

This invention comprehends certain new and useful improvements in starting devices of that type designed particularly for use in connection with explosive-engines, and the invention has for its object an improved device of this character, by means of which the shaft of the engine may be continuously turned in one direction with a minimum exertion on the part of the operator, so as to effect the compression and ignition of a charge and thus conveniently set the engine in motion, and which embodies a peculiar arrangement, whereby the parts of the device are effectually maintained against reverse movement in the event of the shaft being turned in the opposite direction from back pressure, and therefore precluding the liability of injury to the operator, as is frequent with the ordinary starting cranks in general use.

With this and other objects in view that will more fully appear as the description proceeds, the invention consists in certain constructions and arrangements of the parts that I shall hereinafter fully describe and then point out the novel features thereof in the appended claims.

For a full understanding of the invention and the merits thereof, and to acquire a knowledge of the details of construction, reference is to be had to the following description and accompanying drawing, in which:

Figure 1 is a side elevation of a starting device embodying the improvements of my invention; Fig. 2 is a transverse section thereof on the line 2—2 of Fig. 1; Fig. 3 is a face view of one of the bevel gears, showing the crown ratchet carried thereby; Fig. 4 is a detail sectional view, showing the pawls mounted in the friction sleeve; and Fig. 5 is a similar view illustrating the manner of mounting the sleeve upon the shaft.

Corresponding and like parts are referred to in the following description and indicated in all the views of the drawing by the same reference characters.

My improved starting device is designed to be applied to a shaft 1 or similar rotary element of an explosive-engine (not shown) which may be of any desired or approved construction or design, as it in itself forms no part of the present invention. The shaft 1 is preferably journaled at longitudinally spaced points in suitable bearings 2. A sleeve 3 is mounted on the shaft between the bearings in such a manner that the sleeve and shaft constitute a friction clutch, whereby to admit of the shaft turning in the sleeve in event of a back kick. The sleeve is formed with a longitudinal opening 4 extending the entire length thereof and accommodating two sliding pawls 5 and 5$^a$, the extremities of the pawls being similarly beveled, as indicated at 6. An expansion spring 7 is also mounted within the opening 4 and is interposed between the adjacent ends of the pawls and normally exerts its tension to shoot the same longitudinally beyond the opposite ends of the sleeve 3 and project the beveled extremities 6 into the line of the teeth of two crown ratchets 8 and 8$^a$, the teeth of both of the crown ratchets facing in the same circular direction, as shown. The crown ratchets 8 and 8$^a$ are cast integral with or otherwise rigidly secured to two bevel gear wheels 9 and 9$^a$ that are loosely mounted upon the shaft 1 between the ends of the sleeve 3 and the respective bearings 2 and that mesh with a relatively large miter-gear 10 at substantially diametrically opposite points thereof.

It is to be particularly observed that the bearings 2 maintain the loose gears 9 and 9$^a$ against any longitudinal movement on the shaft, whereby to insure of the said gears being held in continuous engagement with the miter-gear 10. In the present instance, in order to attain the element of lightness and also to reduce to a minimum the cost of manufacturing the gears 9, 9$^a$ and 10, I have mutilated the same, as indicated at 11, the mutilated portions of the bevel gear wheels 9 and 9$^a$ being disposed diametrically oppositely to each other, as best illustrated in Fig. 2. The miter-gear 10 is arranged longitudinally of the shaft and is journaled on a suitable supporting bracket 12, a handle 13 being rigid with the miter-gear, so as to admit of the same being turned manually.

In the practical use of my improved starting device, the handle 13 is moved in one direction, say toward the bevel gear 9, and it will be manifest that the consequent movement of the miter-gear 10 effects the turning of the bevel gear 9ª in the direction of the teeth of the crown ratchets, while the bevel gear 9 is turned in the opposite direction. As the bevel gear wheels are thus turned, the beveled extremity 6 of the spring pawl 5 will ride over the teeth of the crown ratchet 8, while the other pawl 5ª will engage with the teeth of the crown ratchet 8ª so as to lock the sleeve 3 thereto and hence effect the turning of the shaft 1 with the bevel gear 9ª, through the instrumentality of the friction clutch. When the handle has reached the limit of its movement in the aforementioned direction, it is reversed and swung toward the bevel gear 9ª and this reverses the direction of movement of the bevel gears, so that the bevel gear 9 is turned in the direction of the teeth of the crown ratchets, while the bevel gear 9ª is turned in the opposite direction, and hence the pawl 5ª will ride over the teeth of the crown ratchet 8ª, while the other pawl will engage with the crown ratchet 8, whereby the rotation of the sleeve 3 and the shaft 1 in the direction of the teeth of the crown ratchets is made continuous. The operator continues to oscillate the handle 13 so as to turn the shaft 1 as just described, as long as is necessary to effect the compression and ignition of a charge in the engine, to set the same in motion.

Should the compressed charge for any reason be not exploded in the cylinder and act upon the shaft 1 to turn the latter from back pressure in the opposite direction, that is, in the direction opposite to the teeth of the crown ratchets, it will be apparent that if the sleeve 3 should tend to move with the shaft, both of the pawls would therefore become engaged with the teeth of the respective crown ratchets. The bevel gear wheels 9 and 9ª would thus tend to be turned with the sleeve 3, but inasmuch as these bevel gear wheels mesh with the miter-gear 10 at substantially diametrically opposite points thereof, it will be observed that in order to effect the rotation of the miter-gear wheel, it is necessary that the bevel gear wheels should turn in the opposite directions, and therefore by such an arrangement the loose gear wheels and the sleeve engaged therewith would be held locked against turning with the shaft, so that the latter revolves within the sleeve, as permitted by the clutch, without effecting the reverse movement of the starting device. The handle 13 is thus held against actuation and hence the operator is not subjected to the liability of injury such as has become so frequent with the use of the ordinary starting crank.

From the foregoing description, in connection with the accompanying drawing, it will be apparent that I have provided an improved device which may be advantageously employed in connection with explosive-engines or the like, although it is not limited to any such use, but is susceptible of various other applications that will at once present themselves to those for whom the device is intended.

Furthermore, it will be observed that the device is positive in action and affords considerable leverage so as to render necessary only a minimum exertion on the part of the operator, the device also possessing the characteristics of simplicity, durability and efficiency in construction and operation, and consisting of comparatively few parts that may be easily and cheaply manufactured and readily assembled.

In the present instance the friction clutch between the shaft and the sleeve is established by splitting the latter longitudinally and connecting the split edges thereof by set screws, as will be observed by reference to Fig. 5. Springs are interposed between the heads of the set screws and the adjacent portions of the sleeve so as to admit of the split edges spreading apart upon the turning of the shaft in the reverse direction from back pressure or the like. The sleeve is formed diametrically opposite to its split edges with a longitudinal bore which reduces the cross sectional area of the sleeve and admits of the same yielding slightly at this point.

Having thus described the invention, what I claim is:

1. In a starting device, the combination of a shaft, gear wheels mounted to turn on the shaft, a sleeve interposed between the gear wheels, means for oscillating the gear wheels in opposite directions, and an operative connection between the gear wheels and the sleeve to effect the continuous movement of the shaft in one direction, the sleeve being mounted on the shaft to turn relative thereto in the other direction, as and for the purpose specified.

2. In a starting device, the combination of a shaft, a sleeve frictionally mounted on the shaft and split longitudinally and formed diametrically opposite to its split edges with a longitudinal bore, a screw passed loosely through one of the split edges of the sleeve and positively secured in the other edge, a coil spring encircling the screw and interposed between the head thereof and the adjacent portion of the sleeve, and gearing for turning the sleeve continuously in one direction.

3. In a starting device, the combination of a shaft, gear wheels loosely mounted upon the shaft, a sleeve interposed between the gear wheels, means for oscillating the gear wheels in opposite directions, and an operative connection between the gear wheels and the sleeve to effect the continuous movement of the shaft in one direction, the sleeve being frictionally mounted on the shaft to turn relative thereto in the other direction.

4. In a starting device, the combination of a shaft, gears loosely mounted upon the shaft and provided with crown ratchets, a sleeve mounted upon the shaft and interposed between the crown ratchets, means for oscillating the gears in opposite directions, and pawls carried by the sleeve and spring-pressed to engage the crown ratchets to effect the continuous movement of the shaft in one direction, the sleeve being mounted on the shaft to turn relative thereto in the other direction.

5. In a starting device, the combination of a shaft, longitudinally spaced gears mounted to turn on the shaft and held against longitudinal movement thereon, the gears being provided with opposing crown ratchets, a sleeve mounted on the shaft and interposed between the crown ratchets, a driving gear meshing with both of the first named gears, means for oscillating the driving gear, and pawls carried by the sleeve and spring-pressed to engage the respective crown ratchets to effect the continuous movement of the shaft in one direction.

In testimony whereof I affix my signature in presence of two witnesses.

JAMES T. BARBER. [L. S.]

Witnesses:
 JOHN P. CARLSON,
 GEORGE FEY.